United States Patent [19]
Pipitone

[11] 3,987,253
[45] Oct. 19, 1976

[54] HYBRID COUPLING FOR TELECOMMUNICATION SYSTEM
[75] Inventor: Roberto Pipitone, Milan, Italy
[73] Assignee: Societa Italiana Telecomunicazioni SpA, Milan, Italy
[22] Filed: Mar. 20, 1975
[21] Appl. No.: 560,517

[30] Foreign Application Priority Data
Mar. 21, 1974 Italy................................. 67890/74

[52] U.S. Cl. ............................ 179/81 B; 179/81 R; 179/170 NC
[51] Int. Cl.² ....................... H04B 1/52; H04M 1/00
[58] Field of Search ............. 179/81 R, 81 A, 81 B, 179/170 NC, 170 D, 1 HF, 1 CN

[56] References Cited
UNITED STATES PATENTS
3,033,940   5/1962   Cox.................................... 179/81 B
3,440,367   4/1969   Holtz............................ 179/170 NC
3,748,400   7/1973   Ritz et al..................... 179/81 B
FOREIGN PATENTS OR APPLICATIONS
1,257,878  12/1971   United Kingdom............... 179/81 A Primary Examiner—William C. Cooper
Assistant Examiner—Randall P. Myers
Attorney, Agent, or Firm—Karl F. Ross; Herbert Dubno

[57] ABSTRACT

A coupling circuit for a telecommunication system comprises a resistance bridge whose four arms consist each of two identical halves in series with each other, the resistive halves of one pair of opposite arms being of relatively high magnitude while the resistive halves of the other pair of opposite arms are of relatively low magnitude. A two-wire line is connected across a first bridge diagonal while a matching load impedance is connected across the other diagonal. A signal-transmitting circuit, including a microphone, is connected across the midpoints of the low-resistance arms whereas a signal-receiving circuit, including an earphone, is connected across the midpoints of the high-resistance arms.

5 Claims, 3 Drawing Figures

HYBRID COUPLING FOR TELECOMMUNICATION SYSTEM

FIELD OF THE INVENTION

My present invention relates to a coupling circuit of the hybrid type as used in telecommunication systems to connect a two-wire line, generally of unbalanced character, to a pair of two-terminal networks in mutually conjugate relationship, i.e. without objectionable cross-talk between these networks.

BACKGROUND OF THE INVENTION

In order to establish a working connection between a signal transmitter and a signal receiver, on the one hand, and a two-wire line common thereto, on the other hand, use is conventionally made of a so-called hybrid-coil transformer having a split primary winding in series with the line. A transmitting circuit, connected to an intermediate point of the primary winding of this transformer, and a receiving circuit, connected across an associated secondary winding, are effectively decoupled from each other while independently communicating with the line. In order to minimize the generation of line noise due to such an inherently unbalanced connection, it has already been proposed to insert two sections of the primary winding symmetrically in the two line wires between the transmitting network and a remote station.

In all these instances, the need for an inductive coupling prevents the use of integrated circuitry and consequently requires a relatively bulky and weighty structure.

OBJECTS OF THE INVENTION

The general object of my present invention, therefore, is to provide a transformerless coupling circuit of the character described, adapted to be miniaturized by integrated-circuit technique.

A more specific object is to provide a circuit of this nature which is well balanced with reference to the associated line and which therefore does not give rise to any line noise in response to, for example, extraneous signals capacitively picked up by a microphone in the transmitting network.

SUMMARY OF THE INVENTION

These objects are realized, in conformity with my present invention, by the provision of a resistance bridge whose four arms consist each of two halves in series with each other, the halves of one pair of opposite arms being constituted by two mutually identical resistances of a relatively high magnitude, the halves of the other pair of opposite arms being constituted by two mutually identical resistances of a relatively low magnitude. The two-wire line is connected across a first bridge diagonal while a matching impedance is connected across a second diagonal defined by the junctions of the four bridge arms; one of the two mutually conjugate networks, preferably the one containing the signal receiver, is connected across the midpoints of the high-resistance pair of opposite arms while the other network, preferably the one containing the signal transmitter, is connected across the midpoints of the low-resistance pair of opposite arms.

In order to eliminate low-impedance shunts, the terminal resistances of the two networks as seen from the bridge (i.e. the input resistance of the receiving network and the output resistance of the transmitting network) must be high compared with the bridge resistances. In my copending application Ser. No. 560,518 of even date I have disclosed particularly advantageous receiving and transmitting amplifiers satisfying this requirement.

BRIEF DESCRIPTION OF THE DRAWING

The above and other features of my invention will now be described in detail with reference to the accompanying drawing in which.

SPECIFIC DESCRIPTION

Figure 1:
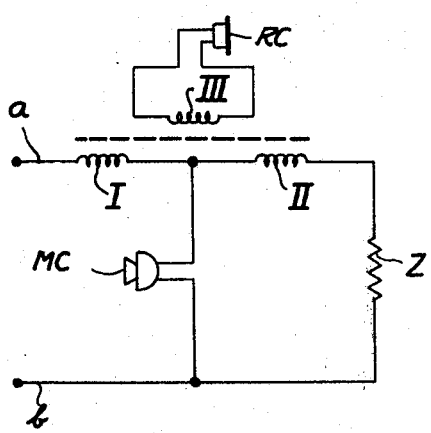
FIGS. 1 and 2 are circuit diagrams of conventional hybrid-coil transformers as used in telephone circuitry.

In FIG. 1 I have shown a prior-art circuit for coupling a two-wire telephone line $a$, $b$, terminated in a matching impedance Z, to a signal transmitter represented by a microphone MC and a signal receiver in the form of an earphone RC. The coupling comprises a hybrid-coil transformer with a split primary winding, consisting of two identical sections I and II inserted in line wire $a$, and an associated secondary winding III working into the receiver RC. Transmitter MC is connected between the junction of winding sections I, II and the other line wire $b$.

Because of the asymmetrical connection of microphone MC to the line, any extraneous potentials capacitively picked up by the normally unshielded microphone conductors, e.g. from incoming signals received over adjoining conductors by the earphone RC, will thus manifest themselves as line noise and may even give rise to regenerative feedback resulting in annoying oscillations.

Figure 2:
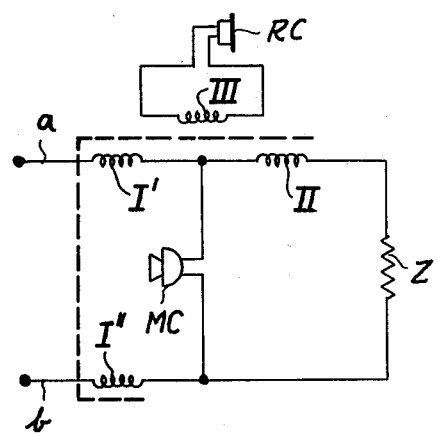

According to FIG. 2, this drawback is conventionally mitigated by dividing the winding section I into two subsections I' and I'' respectively inserted in wires $a$ and $b$ whereby the microphone is symmetrically connected across the line and stray capacitive voltages are balanced out.

In both these conventional systems, however, the inductive coupling between the receiving circuit III, RC and the line prevents the use of integrated circuitry for this hybrid connection.

Figure 3:
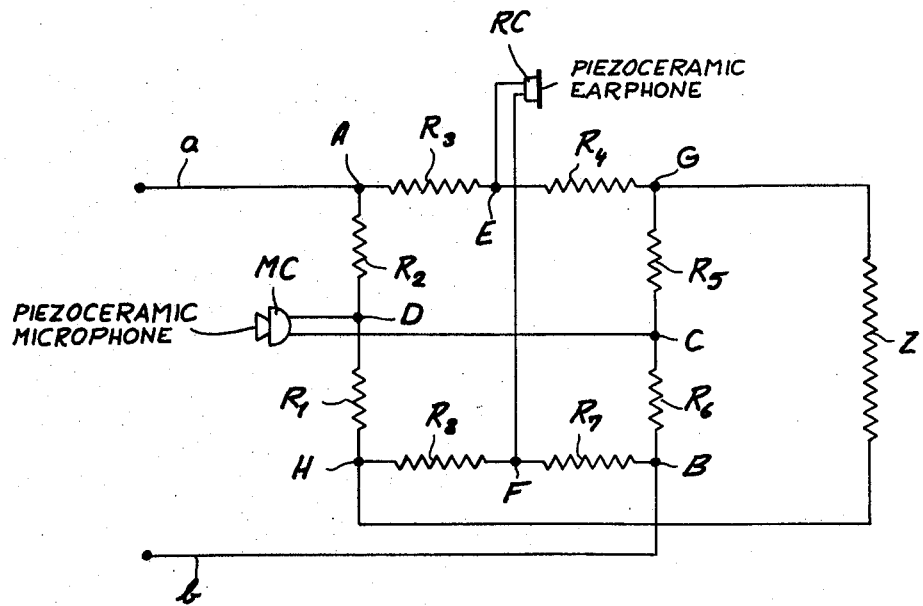
FIG. 3 is a similar circuit diagram showing my improved, transformerless coupling circuit.

In accordance with my present invention, and as illustrated in FIG. 3, I provide a purely resistive hybrid circuit consisting of eight resistances $R_1 - R_8$ interconnected in a closed loop, these resistances being paired to form the arms of a bridge having corners A, B, G and H. Resistances $R_1$, $R_2$ and $R_5$, $R_6$, representing a pair of opposite arms of the bridge, are mutually identical and of relatively small magnitude; resistances $R_3$, $R_4$ and $R_7$, $R_8$, constituting another pair of opposite bridge arms, are also mutually identical and of relatively large magnitude. The midpoints C and D of the low-resistance arms are connected across the signal transmitter MC whereas the midpoints E and F of the high-resistance arms are connected across the signal receiver RC; transmitter MC and receiver RC are advantageously a microphone and an earphone of the piezoelectric (specifically piezoceramic) type, operating on relatively low voltages, and may be provided with associated amplifiers as disclosed and claimed in my copending application Ser. No. 560,518 referred to above. The entire bridge circuit along with the amplifiers may be integrated and the transducers MC and RC may be accommodated in small, identical capsules.

With line $a$, $b$ connected across the bridge diagonal A, B and matching impedance Z connected across the bridge diagonal G, H, the output terminals D and C of microphone MC are connected to wires $a$ and $b$ by way of the two relatively small resistances $R_2$ and $R_6$ but are conjugate with reference to input terminals E and F of earphone RC inasmuch as each of these terminals is separated from either of its neighbors by the series combination of a low and a high resistance. Thus, receiver RC is effectively decoupled from transmitter MC but not from the line $a$, $b$ since each terminal E, F is offset by the value of the lower bridge resistances from the center-point of a respective voltage divider $R_3$, $R_4$, $R_5$, $R_6$ and $R_1$, $R_2$, $R_7$, $R_8$ inserted between wires $a$ and $b$.

If the magnitude of the large bridge resistances is a multiple of that of the small bridge resistances, matching impedance Z may be considered connected to wire $a$ through resistances $R_1$, $R_2$ only and to wire $b$ through resistances $R_5$, $R_6$ only whose magnitudes, of course, will have to be taken into account in the dimensioning of that impedance.

Naturally, any or all of the simple bridge resistances could be replaced by more complex resistive two-terminal networks of equivalent magnitude.

The utility of the coupling circuit herein disclosed is not limited to a subscriber station of a telephone system, as described above, but extends to any other communication system with mutually conjugate networks of high terminal impedance and a common two-wire line connected thereto.

I claim:
1. In a telecommunication system including a two-wire line and two mutually conjugate two-terminal networks, the combination therewith of a coupling circuit comprising a resistance bridge with four arms forming junctions at the ends of a first and a second bridge diagonal, each of said arms consisting of two halves in series with each other, the halves of one pair of opposite arms being constituted by two mutually identical resistances of a relatively high magnitude, the halves of the other pair of opposite arms being constituted by two mutually identical resistances of a relatively low magnitude, said two-wire line being connected across said first diagonal, one of said networks being connected across the midpoints of said one pair of opposite arms, the other of said networks being connected across the midpoints of said other pair of opposite arms, and a line-matching impedance connected across said second diagonal.

2. The combination defined in claim 1 wherein said networks have terminal resistances which are high compared with the resistances of said arms.

3. The combination defined in claim 1 wherein said one of said networks includes a signal receiver and said other of said networks includes a signal transmitter.

4. The combination defined in claim 3 wherein said signal receiver and said signal transmitter are an earphone and a microphone, respectively.

5. The combination defined in claim 4 wherein said earphone and said microphone are of the piezoceramic type.

* * * * *